United States Patent
Shironoshita

(10) Patent No.: US 9,256,639 B2
(45) Date of Patent: Feb. 9, 2016

(54) QUERY OPTIMIZATION FOR SPARQL

(75) Inventor: Emilio Patrick Shironoshita, Miami, FL (US)

(73) Assignee: INFOTECH SOFT, INC., Miami, FL (US)

( * ) Notice: Subject to any disclaimer, the term of this patent is extended or adjusted under 35 U.S.C. 154(b) by 667 days.

(21) Appl. No.: 13/601,158

(22) Filed: Aug. 31, 2012

(65) Prior Publication Data

US 2014/0067793 A1    Mar. 6, 2014

(51) Int. Cl.
*G06F 17/30*    (2006.01)

(52) U.S. Cl.
CPC .................... *G06F 17/30436* (2013.01)

(58) Field of Classification Search
CPC ............... G06F 17/30424; G06F 17/30427; G06F 17/30436; G06F 17/30448; G06F 17/30463; G06F 17/30569; G06F 17/30389; G06F 17/30466; G06F 17/30498; G06F 17/30657
See application file for complete search history.

(56) References Cited

U.S. PATENT DOCUMENTS

| | | | | |
|---|---|---|---|---|
| 7,617,179 B2 * | 11/2009 | Nica | ................ | G06F 17/30466 |
| 8,032,525 B2 * | 10/2011 | Bowers | ................ | G06F 17/30407 707/717 |
| 8,180,801 B2 * | 5/2012 | Zhang | ................ | G06F 17/30386 707/792 |
| 8,275,784 B2 * | 9/2012 | Cao | ................ | G06F 17/30448 707/760 |
| 8,429,179 B1 * | 4/2013 | Mirhaji | ................ | G06F 17/30312 707/756 |
| 8,484,233 B2 * | 7/2013 | Xie | ................ | G06F 17/30389 707/758 |
| 8,533,182 B1 * | 9/2013 | Charboneau | ...... | G06F 17/30979 707/718 |
| 8,688,683 B2 * | 4/2014 | Simon | ................ | G06F 17/30463 707/713 |
| 8,719,252 B2 * | 5/2014 | Miranker | .......... | G06F 17/30569 707/713 |
| 8,745,070 B2 * | 6/2014 | Krishnamurthy | . | G06F 17/30445 707/751 |
| 8,886,631 B2 * | 11/2014 | Abadi | ................ | G06F 17/30445 707/713 |
| 8,935,232 B2 * | 1/2015 | Abadi | ................ | G06F 17/30445 707/713 |
| 8,935,277 B2 * | 1/2015 | Kuchmann-Beauger | ............ | G06F 17/30958 707/769 |
| 8,949,225 B2 * | 2/2015 | Wu | ................... | G06F 17/30569 707/722 |
| 8,983,990 B2 * | 3/2015 | Duan | ................ | G06F 17/30448 707/759 |

(Continued)

OTHER PUBLICATIONS

Shironoshita et. al., semQA: SPARQL with Idempotent Disjunction, Mar. 1, 2009, IEEE, pp. 1-34.*

(Continued)

*Primary Examiner* — Christyann Pulliam
*Assistant Examiner* — Rezwanul Mahmood
(74) *Attorney, Agent, or Firm* — Mark Terry

(57) ABSTRACT

The present invention relates to computer implemented methods and system for creating and executing an query plan for SPARQL Protocol And Query Language (SPARQL) queries. The methods and systems are designed to accept as input a query in SPARQL syntax, convert this query to semQA2 and generate a parse tree, perform filter pushdown, generate an efficient query plan potentially using a cost function, and execute this query plan against data sources complying to or modeled as Resource Description Framework (RDF). The result of these methods and of the systems implementing these methods is a set of triples contained in the data sources that comprise a solution of the SPARQL query provided.

5 Claims, 1 Drawing Sheet

(56) References Cited

U.S. PATENT DOCUMENTS

| | | | | |
|---|---|---|---|---|
| 9,031,933 | B2* | 5/2015 | Bornea | G06F 17/30463 707/718 |
| 2008/0256026 | A1* | 10/2008 | Hays | G06F 17/30389 707/999.002 |
| 2009/0138498 | A1* | 5/2009 | Krishnamoorthy | G06F 17/30427 707/999.103 |
| 2010/0250577 | A1* | 9/2010 | Cao | G06F 17/30448 707/760 |
| 2011/0320431 | A1* | 12/2011 | Jackson | G06F 17/30448 707/713 |
| 2012/0310916 | A1* | 12/2012 | Abadi | G06F 17/30445 707/713 |
| 2013/0262443 | A1* | 10/2013 | Leida | G06F 17/30427 707/722 |
| 2013/0304724 | A1* | 11/2013 | Rosjat et al. | 707/722 |
| 2013/0318070 | A1* | 11/2013 | Wu | G06F 17/30569 707/722 |
| 2014/0172914 | A1* | 6/2014 | Elnikety | G06F 17/30979 707/774 |
| 2014/0304251 | A1* | 10/2014 | Bornea | G06F 17/30463 707/718 |

OTHER PUBLICATIONS

Hartig et. al., The SPARQL Query Graph Model for Query Optimization, 2007, ESWC 2007, 564-578.*
Neumann et. at., Scalable Join Processing on Very Large RDF Graphs, Jun. 29-Jul. 2, 2009, SIGMOD '09, 627-639.*
Hartig, Querying Trust in RDF data with tSPARQL, 2009, ESWC 2009, 5-20.*
Bolles et. al., Streaming SPARQL—Extending SPARQL to Process Data Streams, 2008, ESWC 2008, 448-462.*
W3C, SPARQL Query Language for RDF, Jan. 15, 2008, W3C, W3C Recommendation Jan. 15, 2008, 1-73.*
W3C, SPARQL 1.1 Query Language, Nov. 8, 2012, W3C, W3C proposed Recommendation Nov. 8, 2012, 1-88.*

* cited by examiner

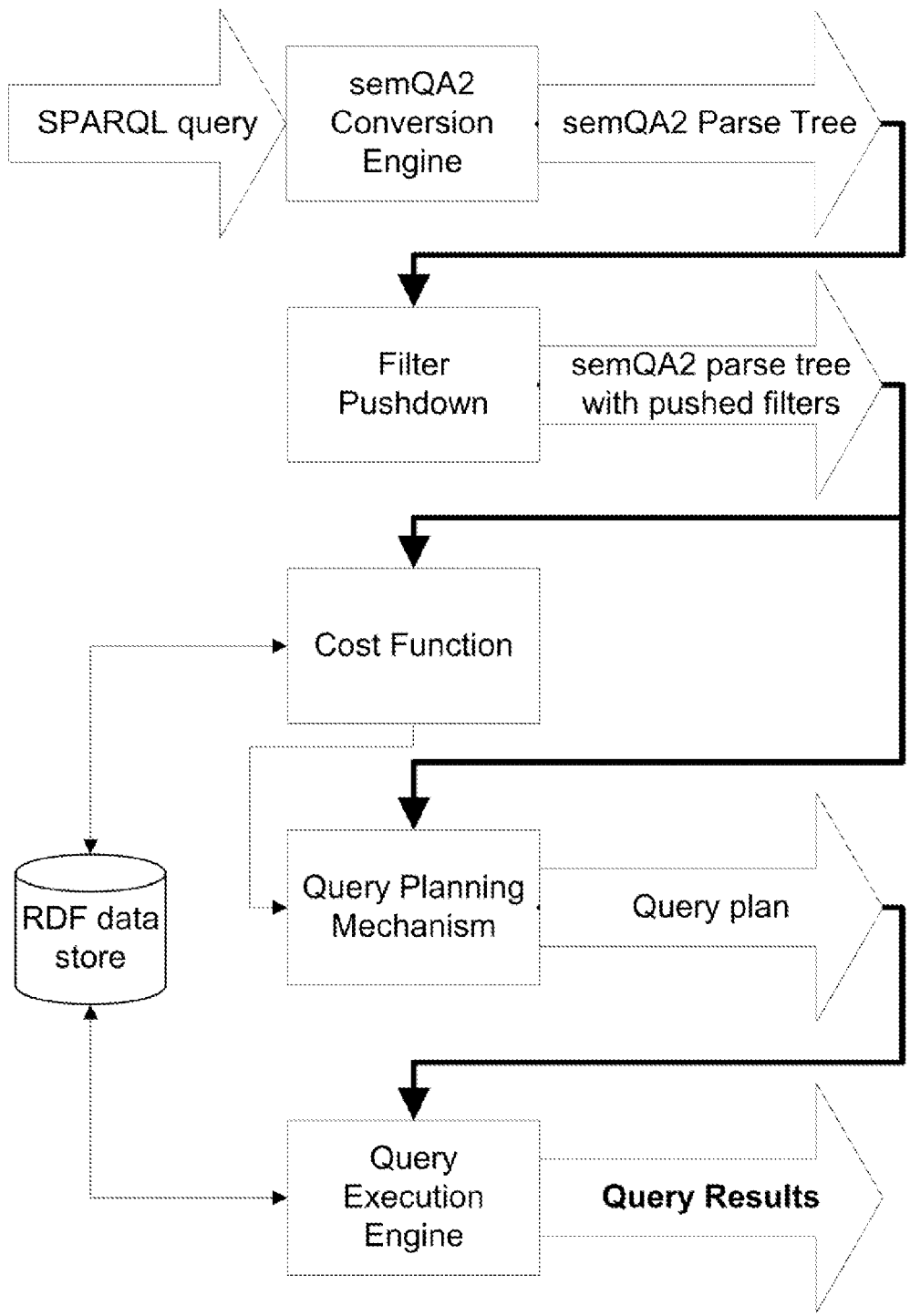

QUERY OPTIMIZATION FOR SPARQL

STATEMENT REGARDING FEDERALLY SPONSORED RESEARCH OR DEVELOPMENT

This invention was made with government support under R43RR018667 and R43CA132293 awarded by the National Institutes of Health (NIH). The government has certain rights in the invention.

CROSS REFERENCE TO RELATED APPLICATION

None.

FIELD OF THE INVENTION

The present invention generally relates to the querying of Resource Description Framework (RDF) datasets. More particularly, the present invention relates to computer implemented methods and systems to plan and evaluate queries using the SPARQL Protocol And Query Language for RDF (SPARQL) query language.

BACKGROUND OF THE INVENTION

The SPARQL Protocol And Query Language for RDF (SPARQL) is a World Wide Web Consortium (W3C) Recommendation for querying Resource Description Framework (RDF) datasets. Currently, a new revision of the specification, SPARQL 1.1, is being developed. SPARQL 1.1 is designed to add functionality in the form of aggregation functions, subqueries, negation, and property paths, but is fully compatible with the previous version, so that any query that is valid under SPARQL 1.0 is also valid under 1.1. The following describes briefly the SPARQL query language; more information can be found in the Recommendation produced by the W3C.

Let I be the set of IRI references, B the set of blank nodes, and L the set of literals.

An RDF graph G is a set of triples $t \in (I \cup B) \times I \times (I \cup B \cup L)$.

The set of RDF terms is $RDF\text{-}T = (I \cup B \cup L)$.

A canonical model of an RDF graph G is a model equivalent to G with blank nodes replaced with some IRI not appearing elsewhere in G nor in the context in which it is used, i.e., in queries. Every subsequent mention of RDF graphs in this application assumes a canonical model.

An RDF dataset D is a set $\{G_o, (u_1, G_1), \ldots, (u_n, G_n)\}$, where each $G_i$ is an RDF graph and each $u_i$ is an IRI; the graph $G_o$ is called the default graph, and each pair $(u_i, G_i)$ is a named graph. One of the graphs in the dataset, called the active graph, is used for basic graph pattern matching.

A triple pattern is a tuple $t_p \in (RDF\text{-}T \cup V) \times (I \cup V) \times (RDF\text{-}T \cup V)$, where V is a set of variables disjoint from RDF-T.

A basic graph pattern is a set of triple patterns.

A value constraint is a Boolean-valued expression using elements from $(RDF\text{-}T \cup V)$, logical functions, equality and inequality symbols, and unary predicates.

Let P1, P2 be graph patterns, and r a value constraint; the SPARQL standard defines the following expressions:
a basic graph pattern {P1. P2}
a graph pattern with filter {P1 FILTER r},
a group graph pattern {P1} {P2},
an alternative graph pattern {P1} UNION {P2}, and
an optional graph pattern {P1} OPTIONAL {P2}.

These SPARQL expressions can be defined in turn by SPARQL algebra operators as shown in the following table:

| SPARQL syntactic expression | SPARQL algebra operator |
|---|---|
| P1.P2 | Join(P1,P2) |
| P1 . FILTER r | Filter(r,P1) |
| {PI}{P2} | Join(P1,P2) |
| P1 UNION P2 | Union(P1,P2) |
| P1 OPTIONAL P2 . FILTER r | LeftJoin(P1,P2,r) |
| | Diff(P1,P2,r) |

SPARQL also defines a graph graph pattern, which does not lend itself to algebraic manipulation and which is therefore ignored in this document.

Note that the Join operator defines both the basic graph pattern and the group graph pattern, since functionally these two graph patterns are equivalent, and group graph patterns are essentially used to define scoping of variables and other operators. Note also that the Diff operator does not have a counterpart syntactic expression, since this operator is only used internally in the SPARQL algebra, as part of the definition of the LeftJoin operator.

It should also be observed that, in rigor, the SPARQL algebraic expressions operate over solution multisets rather than over graph patterns. We denote graph patterns and their solution multisets with the same symbols for simplicity, since in this context it is not necessary to make such distinction.

Given two graph patterns P1 and P2, we say that P2 implies P1, and denote it P1←P2, if for every RDF graph G, every solution for P2 is also a solution for P1. P1 and P2 are said to be equivalent, denoted P1 ↔ P2, if they imply each other. The following equivalences can then be derived from the SPARQL algebra:

$$\text{Commutativity of Join: Join}(P1,P2) \leftrightarrow \text{Join}(P2,P1) \quad (1)$$

$$\text{Commutativity of Or: Or}(P1,P2) \leftrightarrow \text{Or}(P2,P1) \quad (2)$$

$$\text{Associativity of Join: Join}(P1,\text{Join}(P2,P3)) \leftrightarrow \text{Join}(\text{Join}(P1,P2),P3) \quad (3)$$

$$\text{Associativity of Or: Or}(P1,\text{Or}(P2,P3)) \leftrightarrow \text{Or}(\text{Or}(P1,P2),P3) \quad (4)$$

$$\text{Distributivity of Join over Join}(P1,\text{Or}(P2,P3))\text{ Or:} \leftrightarrow \text{Or}(\text{Join}(P1,P2),\text{Join}(P1,P3)) \quad (5)$$

Based on their associativity properties, then, we denote the sequences of binary Join and Or, Join( . . . Join(P1, P2), . . . , Pn) and Or( . . . Or(P1, P2), . . . , Pn), using the multiple-operator shorthands Join(P1, P2, . . . , Pn) and Or(P1, P2, . . . , Pn) respectively.

Algebraic manipulation of SPARQL queries is hampered by the non-distributivity of the disjunction Union operator over the LeftJoin operator. To address this issue, the semQA query algebra extension for SPARQL [1] proposes the definition of an idempotent disjunction operator Or, where Or is distributive over LeftJoin:

Definition 1.

Let P1 and P2 be two graph patterns. The idempotent-disjunction graph pattern Or(P1,P2) results in all solutions for P1 or for P2 such that there does not exist a solution that is a subset of another solution, and such that each solution exists only once in the solution set. In this way, a solution for Or(P1, P2) is a solution for Union (P1, P2) that is not a subset of any other solution for Or(P1, P2). This definition makes Or an idempotent disjunction.

With this Or operator, LeftJoin can be expressed in terms of Or and Join:

LeftJoin conversion: LeftJoin(P1,P2,r) ↔ Or(P1, Filter(r,Join(P1,P2)))      (6)

This conversion of LeftJoin into a graph pattern consisting of Or and Join permits the elimination of any LeftJoin within the graph pattern, simplifying algebraic manipulation of queries. semQA then proposes mechanisms where any SPARQL graph pattern is converted to an i-d graph pattern by changing every Union operator for an Or operator, and replacing every LeftJoin operator by its equivalent Or-Join expression.

To drive optimization of queries, semQA also proposes filter pushdown methods against both Or and Join:

Filter(r1&&r2,P1) ↔ Filter(r1,Filter(r2,P1))      (7)

Filter(r1&&r2,P1) ↔ Join(Filter(r1,P1), Filter(r2,P1))      (8)

Filter(r1||r2,P1) ↔ Or(Filter(r1,P1),Filter(r2,P1))      (9)

The symbols && and || denote respectively logical-and logical-or operations on value constraints. To derive additional algebraic equivalences that allow the pushdown of filters, semQA provides a set of definitions that allow the processing of different types of value constraints.

Definition 2.
(a) An atomic value constraint is a value constraint that does not include logical- and or logical-or operators. (b) A conjunctive value constraint is a value constraint composed of one or more atomic value constraints linked by logical-and operators. (c) a value constraint in disjunctive normal form consists of one or more conjunctive value constraints linked by logical-or operators.

Definition 3.
Let var(r) denote the set of variables in a value constraint r. Given a conjunctive value constraint r and a graph pattern P, a restriction of r on P, denoted R(r,P), is defined as follows:
If r is atomic, R(r,P)=r if var(r)⊆var(P) and r is not of the form !bound(v), true otherwise.
If r=(r$_1$ && r$_2$ && ... && r$_n$), where every r$_i$ is a conjunctive value constraint,
R(r,P)=false if for all r$_i$, var(r$_i$)⊂var(P) and r$_i$ is not of the form !bound(v); OT
Otherwise, R(r,P)=R(r$_1$,P) && R(r$_2$,P) && ... && R(r$_n$,P).

Definition 4.
Given a conjunctive value constraint r and graph patterns P1 and P2, the overlap of r on P1 and P2, denoted L(r,P1,P2), is defined as follows:
If r is atomic, L(r,P1,P2) is
  r if it is of the form !bound(v); or if var(r)⊆(var(P1)∪var(P2)), and var(r)⊂var(P1) and var(r)⊂var(P2).
  false if var(r)⊂(var(P1)∪var(P2))
  true if var(r)⊆var(P1) or var(r)⊆var(P2)
If r=(r$_1$ && r$_2$ && ... && r$_n$), where every r$_i$ is a conjunctive value constraint, L(r,P1,P2)=L(r$_1$,P1,P2) && L(r$_2$,P1,P2) && ... && L(r$_n$,P1,P2).
These definitions lead to the following equivalence, supposing that r is a conjunctive value constraint:

Filter(r1,Join(P1,P2)) ↔ Filter(L(r,P1,P2),Join(Filter (R(r,P1),P1),Filter(R(r,P2),P2)))      (10)

In addition, we have the following:

Filter(r1,Or(P1,P2))→Join(Filter(r1,P1), Filter(r1,P2))      (11)

Note that the implication in (11) is unidirectional, since the reverse is not necessarily true. semQA also proposes mechanisms for the resolution of i-d graph patterns to create result sets conformant to the original SPARQL graph pattern. This is done by taking the results obtained from evaluation of an i-d graph pattern and constructing SPARQL results by processing them through the SPARQL query.

While this method is mathematically sound, it suffers from an important drawback. The expansion of LeftJoin into its Or-Join equivalent, and the subsequent conversion of the resulting semQA graph pattern into disjunctive normal form, increases exponentially the size of the query. This patent application concerns a set of mechanisms and an implementation designed to enable the algebraic processing of SPARQL queries into semQA2 graph patterns that do not need to eliminate the LeftJoin operator. For this, we make use of the algebraic principles already developed under semQA to improve query performance, we add capabilities for the algebraic manipulation and pushdown of filters with LeftJoin operators, and we define a mechanism to create an optimized SPARQL query plan using semQA2.

SUMMARY OF THE INVENTION

In accordance with the present invention, computer implemented methods and systems are provided for efficiently retrieving results for a query written in the SPARQL query language. In accordance with some embodiments of the present invention, in response to receiving a query defined in SPARQL, a parse tree based on a semQA2 query representation is created. In some embodiments, a filter pushdown mechanism is used to push the filters as close to the leaves of the parse tree as possible. Various embodiments of the present invention use different mechanisms for query planning, including a disjunctive-normal form procedure, a greedy query plan selection procedure, and a two-level plan selection procedure. In order to perform this query planning, some embodiments use a cost function that estimates the cost of execution of a given semQA2 graph pattern query. The result of this query planning is a semQA2 query plan, which is then processed through an execution engine to retrieve solution sets to the original SPARQL query. Some embodiments also use optimization mechanisms for query execution, including binding-set nested loop joins.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawing and descriptive matter in which there is illustrated preferred embodiments of the invention.

BRIEF DESCRIPTION OF THE DRAWINGS

Additional embodiments of the invention, its nature and its various advantages, will be more apparent upon consideration of the following detailed description, taken in conjunction with the accompanying drawing, in which like reference characters refer to like parts throughout, and in which:

FIG. 1 is a simplified illustration of the process for SPARQL query optimization using semQA2 query algebra manipulation.

DETAILED DESCRIPTION OF THE INVENTION

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

FIG. 1 is an illustration of the semQA2 query optimization process. It is designed to work over a SPARQL graph pattern, and to retrieve a result set that matches this graph pattern. As shown in FIG. 1, this process consists of four specific parts:

- A semQA2 conversion engine that takes a SPARQL graph pattern and converts it into a semQA2 parse tree by replacing syntax expressions with algebraic operators.
- A filter pushdown mechanism that takes the semQA2 parse tree and pushes down filters according to the identities defined herein, resulting in filters as close to the leaf nodes of the parse tree as possible.
- A cost function, which provides information on the cost of execution of a given semQA2 graph pattern against a data source.
- A query planning mechanism, which uses semQA2 algebraic equivalences and filter pushdown to find multiple equivalent graph patterns, uses the cost function to cost these alternatives, and selects the alternative with the lowest cost.
- A query execution engine, which takes a query plan and executes it against an RDF data source, obtaining a result set that is SPARQL-compliant.

Before describing each of these components of the semQA2 process, we first present a set of algebraic derivations involving the LeftJoin operator, which complement the algebraic equivalences already defined in semQA for the other SPARQL operators.

LeftJoins and Value Constraints

First, note that the definition of LeftJoin in the SPARQL algebra incorporates a value constraint in it. This value constraint exists because it is necessary to separate the application of a Filter to an entire LeftJoin operation, from the operation of a value constraint only on the optional side of the LeftJoin. Thus, for P1 and P2 graph patterns, and r a value constraint, $$\text{LeftJoin}(P1,P2,r) \neq \text{Filter}(r,\text{LeftJoin}(P1,P2,\text{true})) \qquad (12)$$

The inclusion of a value constraint in the LeftJoin definition causes significant problems to the algebraic operation of LeftJoins, however, since the filtering implied by the constraint must be taken into account. However, many (arguably, most) uses of the LeftJoin (OPTIONAL) operator do not include the FILTER expression; its inclusion in the algebraic definition is apparently due to the necessity of taking into account the case when the filter expression does exist.

Using the Or operator introduced in semQA, however, we show that any LeftJoin expression that includes a value constraint can be converted into one that does not include it. First, for ease of reading, we define an abbreviated version of the LeftJoin operator as follows: given graph patterns P1, P2, we denote LeftJoin(P1,P2,true) as LeftJoin(P1,P2). Then, for graph patterns P1 and P2, and value constraint r, we can derive the following:

$$\text{LeftJoin}(P1,P2,r) \leftrightarrow \text{Or}(P1,\text{Filter}(r,\text{LeftJoin}(P1,P2))) \qquad (13)$$

With the application of equation (13), then, any LeftJoin operator that includes a value constraint can be converted into an expression that includes an Or and a Filter operator, as well as a LeftJoin without the value constraint. This then facilitates the use of algebraic expressions on LeftJoins.

Distributivity of LeftJoin Over Or

LeftJoin is both left-distributive and right-distributive over Or. That is, given graph patterns P1, P2, and P3, $$\text{LeftJoin}(\text{Or}(P1,P2),P3) \leftrightarrow \text{Or}(\text{LeftJoin}(P1,P3),\text{LeftJoin}(P2,P3))) \qquad (14)$$

$$\text{LeftJoin}(P1,\text{Or}(P2,P3)) \leftrightarrow \text{Or}(\text{LeftJoin}(P1,P2),\text{LeftJoin}(P1,P3))) \qquad (15)$$

Commutativity of LeftJoins

In nested LeftJoin operators where the nesting is done at the optional operators, the order of optional operands does not alter the results, that is, the LeftJoin operator is commutative on the optional operands only. Given graph patterns P1, P2, and P3, $$\text{LeftJoin}(\text{LeftJoin}(P1,P2),P3) \leftrightarrow \text{LeftJoin}(\text{LeftJoin}(P1,P3),P2) \qquad (16)$$

This identity can be extended to multiple nested LeftJoins, so long as the nesting is done on the left-hand-side operand. As a shorthand notation, then, and in a similar manner as with Join and Or, we shall denote LeftJoin(LeftJoin( . . . (LeftJoin(P1,P2),P3), . . . ), Pn) as LeftJoin (P1, P2, P3, . . . , Pn), where P2 . . . Pn are the optional operands, and P1 is called the base operand.

Relationship Between LeftJoin and Join

Joins can be pushed down inside LeftJoins, or conversely, pulled up on top of LeftJoins, using the following identities, given graph patterns P1, P2, and P3:

$$\text{Join}(P1,\text{LeftJoin}(P2,P3)) \leftrightarrow \text{LeftJoin}(\text{Join}(P1,P2),P3) \qquad (17)$$

$$\text{Join}(\text{LeftJoin}(P1,P2),\text{LeftJoin}(P1,P3)) \leftrightarrow \text{LeftJoin}(\text{LeftJoin}(P1,P2),P3) \qquad (18)$$

$$\text{Join}(\text{LeftJoin}(P1,P2),\text{LeftJoin}(P3,P4)) \leftrightarrow \text{LeftJoin}(\text{Join}(P1,P3),P2,P4) \qquad (19)$$

Filter Pushdown Over LeftJoins

In order to process algebraically a complete SPARQL graph pattern expression, it is also desirable to be able to push down Filters over LeftJoins.

$$\text{Filter}(r,\text{LeftJoin}(P1,P2)) \leftrightarrow \text{Filter}(L(r,P1,P2),\text{Join} \\ (\text{Filter}(R(r,P1),P1),\text{Filter}(R(r,P2),P2))) \quad (20)$$

That is, the pushdown of Filters into LeftJoins follows the same principle as the pushdown over Joins.

Mechanism for Conversion of SPARQL Query Graph Pattern to semQA2

The SPARQL query graph pattern is converted to semQA2 by replacing SPARQL syntactic operators with semQA2 algebraic operators as follows:

| SPARQL syntactic expression | semQA2 algebra operator |
|---|---|
| P1.P2 | Join(P1,P2) |
| P1 . FILTER r | Filter(r,P1) |
| {P1}{P2} | Join(P1,P2) |
| P1 UNION P2 | Or(P1,P2) |
| P1 OPTIONAL P2 . FILTER r | LeftJoin(P1,P2,r) |

A parse tree of the semQA2 query graph pattern is then created by defining a tree node for each operator in the graph pattern. Filter operators will be nodes with only one child. Or and Join operators have multiple children. LeftJoin operators also have multiple children, but the leftmost child represents the base operand of the LeftJoin operator.

Mechanism for Filter Pushdown

The filter pushdown mechanism then applies a procedure as follows:
1. Convert all LeftJoin expressions with filters into LeftJoin expressions without filters applying equation (13).
2. Convert all value constraints in filter expressions to disjunctive normal form using Boolean algebra.
3. Apply equations (8) and (9) to resolve all logical-and logical-or expressions within value constraints. At this point, all filters contain only atomic value constraints.
4. Recursively apply equations (10), (11), and (20) to push down filters through LeftJoin, Joins, and Ors, either until filters are acting directly on triple patterns, or until filters cannot longer be pushed down through their operators.

Mechanisms for Query Planning

The query planning mechanism seeks to find the optimal, or at least a highly efficient, plan to find matches to query graph patterns.

It then uses the cost function to determine an efficient query plan. In the following discussions we denote the cost function as Cost (P) for graph pattern P. The cost function can be any function over the information contained in the target RDF data store that indicates the relative cost of executing a partial query. Three different approaches are considered: a deterministic procedure, a greedy selection procedure, and a two-level selection procedure. These are described following:

Disjunctive-Normal-Form Procedure for Query Planning:

This procedure is based on the assumption that it is best to perform all Join and LeftJoin operations before performing any Or operations, putting the query in disjunctive-normal form. In general, this may not be the case, since Joins and LeftJoins may produce result sets that are much larger than those that may be produced by Or. However, most Join and LeftJoin operators are designed to select a relatively small subset of the total number of possible results; therefore, in some general cases, this procedure will select a reasonably efficient query plan with a small time complexity. The process is as follows:

1. Convert the parse tree into a three-level tree in disjunctive normal form, by pushing all Join and LeftJoin operators inside any Or operators.
2. Push all LeftJoin operators inside Join operators.
3. Select the order of Join and LeftJoin operation based on the cost of each graph pattern.

Greedy Query Plan Selection Procedure:
1. This processes the tree breadth-first from the bottom up and selects the best graph pattern at each node.
2. Start at any node of maximum depth for the parse tree.
3. While the root is not processed:
   a. Determine all potential query plans $P_i^k$ for each node k by attempting to match the tree rooted at node k to any of the semQA2 identities.
   b. Select query plan with lowest value for Cost $(P_i^k)$.
   c. Substitute node k for the selected plan $P_i^k$.
   d. Select another node at the same depth as node k that has not yet been processed. If no such node exists, reduce the depth by one and select a node at that depth.
4. This greedy process results in a reasonably efficient plan, with the planning process performed in linear time with respect to the number of nodes in the parse tree. However, it does not ensure optimum selection of plans, since it does not take into account the influence of plan selection at one depth on the nodes at higher depths.

Two-Level Plan Selection Procedure:

This planning process is similar to the previous, but takes into account the fact that semQA2 identities operate over two levels, thus producing the selection of graph patterns in two levels.
1. Start at any node of maximum depth for the parse tree.
2. While the root is not processed:
   a. Determine all potential query plans $P_i^k$ for each node k by looking at all the possible trees with root at node k and with all possible alternatives at a depth of one more than the node, with a path to node k.
   b. Conserve information about the cost for Cost $(P_i^k)$ of all potential query plans $P_i^k$, in order to provide all potential alternatives to the node sitting one level above.
   c. Select another node at the same depth as node k that has not yet been processed. If no such node exists, reduce the depth by one and select a node at that depth.
3. Starting at the root node, and while there are still nodes to be processed:
   a. For node k, select query plan with lowest value for Cost $(P_i^k)$.
   b. Replace node k with selected query plan.
   c. Select another node at the same depth as node k that has not yet been processed. If no such node exists, increase the depth by one and select a node at that depth if one exists.

Mechanisms for Query Execution

The query execution mechanism is designed to retrieve the solution set of the original SPARQL query graph pattern from an RDF data store. It does so as follows:
1. The parse tree is traversed depth-first.
2. At a leaf in the parse tree, corresponding to a triple pattern, this triple pattern is matched against the contents of the RDF data store, retrieving all triples in the data store that match each triple pattern.
3. At other nodes in the parse tree, the corresponding operation is performed. For example, at an Or node, all the solutions of its operands are set-unioned together, eliminating duplicates and sub-graphs.
4. Once the entire set of solutions are obtained for the semQA2 parse tree, then the semQA disjunction correction algorithm is applied. This algorithm takes all the solutions of the semQA2 parse tree, and verifies them individually against the original SPARQL query. At each SPARQL query node, it also verifies whether the solution can generate multiple solutions, and inserts the verified solutions into the final SPARQL result set.

In addition to this standard query execution, other mechanisms for implementation and optimization of Joins between subgraphs can be implemented in some embodiments of this invention. In particular, mechanisms for binding-set-nested loop joins can be implemented, where the results of one operand of a Join are used to filter the results from the other operands within the same Join, similarly to the join mechanisms done in other query languages, notably SQL.

Presentation of Procedures

It is understood herein that the detailed description may be presented in terms of program procedures executed on a computer or network of computers. These procedural descriptions and representations are the means used by those skilled in the art to most effectively convey the substance of their work to other skilled in the art.

A procedure is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, smartphone, the Internet, an Intranet, etc. Either of these may be implemented as a distributed computer system rather than a single computer. Moreover, the processing could be controlled by a software program on one or more computer systems or processors, or could even be partially or wholly implemented in hardware.

Portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C++, or any assembly language appropriate in view of the processor being used. It could also be written in an object-oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

REFERENCES

1. Shironoshita E P, Jean-Mary Y R, Bradley R M, Kabuka M R. semQA: SPARQL with Idempotent Disjunction. Knowledge and Data Engineering, IEEE Transactions on. 2009; 21(3):401-414.

What is claimed is:

1. A computer implemented method for efficiently planning and executing a SPARQL query, in any of the variants of the SPARQL query language, against a data source compliant with Resource Description Framework (RDF) standard, the method comprising:

receiving a SPARQL query graph pattern;

converting the SPARQL query to a semQA2 query and creating a semQA2 parse tree by replacing syntax expression in the SPARQL query with algebraic operators, wherein LeftJoin operators in the SPARQL query are not eliminated;

performing filter pushdown on the semQA2 parse tree, including filters with LeftJoin operators, so as to produce filters as close to leaf nodes of the semQA2 parse tree as possible;

executing a query planning mechanism that uses semQA2 algebraic equivalences and filter pushdown to find multiple graph patterns equivalent to the semQA2 query;

executing a cost function that provides a cost of execution of each of the multiple graph patterns equivalent to the semQA2 query;

determining an efficient query plan for execution of the semQA2 query, by selecting, from the multiple graph patterns equivalent to the semQA2 query, a particular graph pattern with lowest cost of execution, according to the cost function; and executing the particular graph pattern against a RDF data source and retrieving results compliant with the SPARQL specification.

2. The method of claim 1, wherein query planning is performed using a deterministic procedure to create a disjunctive-normal form query.

3. The method of claim 1, wherein queries are performed against data sources modeled as RDF but not natively compliant with RDF.

4. The method of claim 1, wherein queries are performed against data sources modeled using Web Ontology Language (OWL).

5. A data processing system for executing SPARQL queries, the system comprising:
- a display device; and
- a processor configured to:
- receive a SPARQL query graph pattern;
- convert the SPARQL query to a semQA2 parse tree by replacing syntax expression in the SPARQL query with algebraic operators, wherein LeftJoin operators in the SPARQL query are not eliminated;
- perform filter pushdown on the semQA2 parse tree, including filters with LeftJoin operators, so as to produce filters as close to leaf nodes of the semQA2 parse tree as possible;
- execute a query planning mechanism that uses semQA2 algebraic equivalences and filter pushdown to find multiple graph patterns equivalent to the semQA2 query;
- execute a cost function that provides a cost of execution of each of the multiple graph patterns equivalent to the semQA2 query;
- determine an efficient query plan for execution of the semQA2 query, by selecting, from the multiple graph patterns equivalent to the semQA2 query, a particular graph pattern with lowest cost of execution, according to the cost function; and
- execute the query against a RDF data source and retrieving results compliant with the SPARQL specification.

* * * * *